United States Patent [19]

Generini

[11] 4,170,552
[45] Oct. 9, 1979

[54] METHOD FOR COALESCING MERCURY PARTICLES

[75] Inventor: Gianni Generini, Ravenna, Italy

[73] Assignee: Anic S.p.A., Palermo, Italy

[21] Appl. No.: 809,439

[22] Filed: Jun. 23, 1977

[30] Foreign Application Priority Data

Jul. 2, 1976 [IT] Italy ................................ 24984 A/76

[51] Int. Cl.$^2$ ........................... C02B 9/00; C02C 5/00
[52] U.S. Cl. ........................................ 210/42 S; 55/3; 204/150; 210/50
[58] Field of Search ............... 55/3, 100; 75/108, 109, 75/121; 204/149, 150; 209/5, 51; 210/42 S, 50, 222, 223

[56] References Cited

U.S. PATENT DOCUMENTS

| | | | |
|---|---|---|---|
| 3,697,420 | 10/1972 | Blaisdell et al. | 210/222 |
| 3,714,037 | 1/1973 | Almasi et al. | 210/42 S |
| 3,931,007 | 1/1976 | Sugano et al. | 210/50 |

FOREIGN PATENT DOCUMENTS 51-20467  2/1976  Japan ...................................... 210/42 S

*Primary Examiner*—Charles N. Hart
*Assistant Examiner*—Peter A. Hruskoci
*Attorney, Agent, or Firm*—Morgan, Finnegan, Pine, Foley & Lee

[57] ABSTRACT

Mercury particles which are difficult to strip from sewage waters of industries employing mercury compounds, due to their extremely tiny size, can be coalesced into larger mercury drops by applying a strong magnetic field to the liquor which contains such tiny particles.

3 Claims, No Drawings

METHOD FOR COALESCING MERCURY PARTICLES

This invention relates to a method for coalescing particles of metallic mercury in media which contain such particles, especially in fluid media, so as to encourage the formation of particles having an increased size with respect to the starting size.

More particularly, an object of the present invention is to provide a method for coalescing particles of metalic mercury in fluid media containing them, by using the action of a magnetic field so as to form particles having an increased size and to permit their withdrawal from the medium and, possibly, their recovery.

Methods are known which permit to remove metallic mercury from media containing it. The particles having the larger sizes are mechanically collected, for example, by decantation or deposit in specially provided vessels.

When particles contained in liquid media are involved, it is possible to carry out the flocculation of hydroxides of metals contained in the liquor by entraining the mercury particles with the flocculates and separating such particles thereafter with conventional means.

Sometime, however, metallic mercury is in the form of so tiny particles that they cannot be decanted or they cannot be deposited within commercially acceptable a time, or they cannot be encased in the metal hydroxide.

This is the case of the purification of the industrial sewage waters which contain mercury in the form of organic or inorganic compounds, such purification being carried out by chemical or electrochemical reduction of the mercury compounds to elemental mercury.

Electrochemical reduction can be carried out, for example, by the action of two elements of a different nature immersed in the solution to be purified under appropriate pH conditions, said elements being electrically connected in the interior of the liquid phase or externally of it, such as disclosed in the Italian Patent Specification No. 926 615 by SNAMPROGETTI S.p.A., which corresponds to U.S. Pat. No. 4,035,269.

According to the method of said patent, to which reference is made hereinafter but without being anyway restricted thereto, the quantitative conversion of mercury compounds, both organic and inorganic, can be achieved by properly selecting the elements to be used for the reduction (a metal less noble than hydrogen and carbon, or another metal nobler than hydrogen).

Metals of the type of aluminum, iron, zinc and others, in addition to effecting the reduction of the mercury contained in the inorganic compounds, displace mercury also from its organic compounds and originate, in addition to elemental mercury, also other metallic organic compounds which can easily be hydrolyzed.

These latter compounds, when hydrolyzed under appropriate pH conditions, give rise to bulky precipitates which, during flocculation, can electrostatically encase the mercury particles of more minute size and entrain them therewith.

Mercury is then separated from the metal hydroxide according to conventional procedures.

In spite of this, metallic mercury particles can be formed having such a size as to not permit their decantation within a commercially acceptable time interval, or their encasing in the metal hydroxide mass.

In such cases the purification would be both incomplete and unsatisfactory.

It has now been surprisingly ascertained that by subjecting the sewage waters after the reduction of the mercury compounds to elemental mercury to a magnetic field, coalescence of the mercury particles is experienced, and such particles thus form drops of an increased size which can be separated with the conventional mechanical methods.

The applied magnetic field must have an appropriate strength, which is advantageously equal to 6,000 Gauss or over.

This method can be applied to any system in which there is production of particulated mercury in the form of tiny particles, both in a liquid and in a gaseous medium, and also to the purification of sewage waters by reduction to metallic mercury, from the roasting fumes of mercury-containing materials, from the distillation of mercury and so on.

The examples reported herein are referred, however, but without limitation, to the separation from liquid media as indicated in the foregoing.

EXAMPLE 1

The installations for the production of acetaldehyde from acetylene use a catalyst which is composed by ferrous sulfate, mercury and nitric acid, which, during progress of its catalytic action, undergoes several reactions and intermediate combinations (for example with acetylene) so that mercury is eventually found in the dumped waters, partly in the form of inorganic salts, and partly as methylmercury sulfate and dimethylmercury sulfate.

The contents of mercury (expressed as a metal) in the solutions dumped from the catalytic sections of installations for the production of acetaldehyde is in the range of 10 milligrams per liter and from 5% to 25% of this is in the form of organic compounds, consistently with the recycle ratio of the waters from the distillation to the abatment of aldehyde vapors.

A sewage solution of this kind has been acidified to a pH of about 2 and fed to a reduction tower filled with iron and carbon with a superficial ratio of the anode to the cathode of from about 1:1 to about 2:1 at a velocity in excess of 15 meters an hour. The velocity has been selected so high to limit the reaction between iron and the acid and the evolution of hydrogen. The solution coming from the reduction tower had a turbid appearance (probably due to the evolved metallic mercury dragged by the water stream) has been transferred to a decanting vessel wherein mercury was decanted. The reduction tower is described in Italian Pat. No. 926,615 which corresponds to U.S. Pat. No. 4,035,269.

Prior to being transferred to the decatation vessel, the solution had been subjected to the action of a magnetic field, as obtained by a Polar water-conditioner equipped with a magnetic filter, the field having an intensity in the neighborhood of 8,000 Gauss.

The solution emerging from the decantation vessel after 30 minutes of stay therein, contained about 0.24 milligrams of elemental mercury per liter.

By a subsequent hydrolysis of the iron salts contained in the solution and consequent flocculation of the iron hydroxides which had been formed, another fraction of the mercury residues was removed by encasing and entraining in the flocculate, the latter being subsequently separated from the sewage waters by filtration. The solution emerging from the filter contained less than 1 microgram (1 thousandth of a milligram) of mercury per liter.

EXAMPLE 2

For comparison purpose, the treatment of the sewage solution of the previous example has been repeated without subjecting the solution to the action of the magnetic field after the treatment in the reduction tower. The solution emerging from the decantation tube after a 30-minute stay therein still contained 3.5 milligrams of mercury per liter.

After a 12-hour stay in the decantation vessel, the solution still contained 0.9 milligrams of mercury per liter.

I claim:

1. A method for the separation of particles of elemental mercury from an aqueous medium, said method comprising subjecting said medium to a magnetic field having a strength of at least 6000 Gauses to cause coalescense of the elemental mercury into drops of mercury that can be separated from said medium by mechanical means and thereafter mechanically separating from said medium the drops of elemental mercury.

2. In a method for the separation of organic or inorganic compounds of mercury from an aqueous medium, said method comprising reducing the organic or inorganic compound of mercury to elemental mercury in the presence of aluminum, iron or zinc to form a reduced mixture of compounds of mercury; subjecting said reduced mixture of compounds to hydrolysis to cause entrainment of the elemental mercury; and thereafter separating the elemental mercury by filtration, the improvement which comprises subjecting said reduced mixture of compounds to a magnetic field having a strength of at least 6000 Gauses to cause coalesence of the elemental mercury into drops of mercury that can be separated by mechanical means, and thereafter separating from said medium the drops of elemental mercury by filtration.

3. The process of claim 2 wherein the aqueous medium is acidified prior to the reducing step.

* * * * *